United States Patent
Fuchs et al.

(12) 
(10) Patent No.: US 6,284,793 B1
(45) Date of Patent: Sep. 4, 2001

(54) PROCESS FOR PREVENTING CONTAMINATION OF THE AQUATIC ENVIRONMENT WITH ORGANISMS FROM BALLAST WATER

(75) Inventors: Rainer Fuchs, Mömbris/Hohl; Michael Huss, Eschborn; Peter Werle, Gelnhausen, all of (DE)

(73) Assignee: Degussa-Huls AG, Hanau (DE)

( * ) Notice: Subject to any disclaimer, the term of this patent is extended or adjusted under 35 U.S.C. 154(b) by 0 days.

(21) Appl. No.: 09/455,503

(22) Filed: Dec. 6, 1999

(30) Foreign Application Priority Data

Dec. 4, 1998 (DE) .............................................. 198 56 071

(51) Int. Cl.⁷ ......................... A01N 37/00; A01N 25/00; A01N 33/00; A01N 43/02; A01N 59/00
(52) U.S. Cl. .......................... 514/557; 424/405; 424/613; 424/616; 514/449; 514/451; 514/452; 514/461; 514/463; 514/467; 514/553; 514/579
(58) Field of Search ..................................... 424/405, 613, 424/616; 514/449, 451, 452, 461, 463, 467, 553, 557, 579

(56) References Cited

U.S. PATENT DOCUMENTS

| | | | |
|---|---|---|---|
| 3,965,264 | * | 6/1976 | Redmore ................................. 514/80 |
| 4,324,784 | * | 4/1982 | Naito et al. ........................... 424/616 |
| 5,256,423 | | 10/1993 | Egusa et al. .......................... 424/616 |
| 5,393,781 | | 2/1995 | Vegega et al. ........................ 514/557 |
| 5,874,476 | * | 2/1999 | Hsu et al. ............................. 514/640 |

* cited by examiner

*Primary Examiner*—Jose' G. Dees
*Assistant Examiner*—Frank Choi
(74) *Attorney, Agent, or Firm*—Pillsbury Winthrop LLP

(57) ABSTRACT

A process for preventing the transfer of harmful organisms of zooplankton including the epifauna thereof and of phytoplankton including its resting stages, which are taken up with the ballast water of ships and transferred to another locality on discharge. The organisms are substantially destroyed by the addition of an agent containing a water-soluble percarboxylic acid with 1 to 6 carbon atoms, particularly an aqueous solution containing peracetic acid and/or performic acid and hydrogen peroxide, in a quantity of 0.1 to 200 mg of percarboxylic acid per liter of ballast water and allowing it to react before discharge. In a preferred embodiment, cyanide is also added to the ballast water.

10 Claims, No Drawings

US 6,284,793 B1

PROCESS FOR PREVENTING CONTAMINATION OF THE AQUATIC ENVIRONMENT WITH ORGANISMS FROM BALLAST WATER

CROSS-REFERENCE TO RELATED APPLICATION

This application is based on German Application DE 198 56 071.0, filed Dec. 4, 1999, which disclosure is incorporated herein by reference.

FIELD OF THE INVENTION

The invention relates to a process for preventing contamination of navigable waters with zooplankton including the epifauna thereof and phytoplankton including the resting stages thereof (cysts) which are taken up with the ballast water of ships and transferred to a new locality when the ballast water is discharged. The process comprises the addition of an agent containing a peroxygen compound to the ballast water, allowing the agent to react in a concentration and for a period such that the organisms are substantially destroyed, and discharge of the ballast water thus treated into the aquatic environment.

BACKGROUND OF THE INVENTION

Shipping has experienced considerable structural changes in recent years. Particularly in container shipping, ship sizes, layover days, loading strategies and hence the amount of ballast water, the residence times thereof and the mixing ratios thereof in harbour and coastal areas have changed considerably resulting in new scenarios and consequently new risks for the transfer of exotic species and bacteria which are pathogenic for humans. Particularly in recent years, it has been confirmed on the basis of extreme examples that such organisms are being transferred with the ballast water from ships to other places with far-reaching consequences for ecology and health. One example of this is the appearance of the zebra mussel in the Great Lakes of North America. This has led both to an alteration in the food structure with consequences for fishing and tourism and to a burden on the energy industry due to the high costs of combating the mussels in power station cooling circuits. Lasting and in some cases irreparable long-term damage is also being caused by the massive transfer of resting cysts of toxic algae which not only results in unwanted bloom but also endangers the cultivation of mussels and oysters in many coastal regions. Finally, the transfer of a species akin to the jellyfish to the Black Sea a few years ago led to the complete collapse of sardine fishing.

The intercontinental transfer of infectious bacteria which are pathological for humans, such as Vibrio Cholearae, serotype 01 L, has been proven by the Institute for Molecular Biology, Baltimore, USA. These examples demonstrate that there is an urgent need for action to develop measures for reducing the risk of transferring exotic plant and animal organisms and pathological bacteria with the ballast water of ships.

There have been many attempts to develop suitable methods for treating ballast water of ships. These methods did not become established because of insufficient effectiveness and/or shortcomings. Although microorganisms can be destroyed by treating the water with strong UV radiation, such radiation does not kill larger organisms contained in zooplankton such as Artemia, crabs, mussels and the eggs thereof. Moreover, UV technology also necessitates expensive pumping of the ballast water.

Ozone is an effective biocide but ozonation of the ballast water of ships is technically too complex. Treatment of the ballast water with hypochlorite has the disadvantages of the formation of organochlorine compounds, the poor stability of hypochlorite, and the corrosiveness thereof.

Many organic compounds are known which are highly effective biocides but their long-term effect or their high stability make them undesirable for use in ballast water. After treatment it should be possible to discharge the biocides with the ballast water in a largely degraded and ecologically harmless form into the aquatic environment. The transit times of a ship and hence the treatment time of the ballast water may range from a few days to many weeks, so control of the residual biocide content is no longer guaranteed.

It is well known that hydrogen peroxide, which decomposes to water and oxygen, has a biocidal effect on certain microorganisms, but mostly only a biostatic effect. The oxidation potential of hydrogen peroxide is generally too low to damage organisms of the zooplankton effectively or to kill them. A process for preventing contamination of navigable waters by cysts of harmful plankton is described in U.S. Pat. No. 5,256,423, which process consists of adding an effective amount of hydrogen peroxide to the ballast water and discharging the ballast water only after a sufficiently long reaction time during which the cysts are substantially destroyed. The cysts which can be destroyed by this process are resting stages of the algae belonging to the phytoplankton. As practical experience has shown, the spectrum of action of hydrogen peroxide is not sufficient for treating ballast water because other stages and types of phytoplankton and zooplankton, including their resting stages which are also present in the ballast water, are destroyed incompletely, if at all.

It is known from U.S. Pat. No. 5,393,781 that zebra mussels in the adult and larval forms can be controlled by contact with peracetic acid. A solution containing peracetic acid in an effective amount is added, for example, to a water inlet or a storage vessel of a water treatment plant. The use of a peracetic acid solution for the treatment of ballast water of ships in order to prevent the transfer of species of organism to a new locality or from one aquatic environment to another is neither disclosed nor suggested in this document. Furthermore, it does not disclose whether and on what scale the eggs of zebra mussels and of other organisms of the zooplankton including the epifauna thereof are destroyed by peracetic acid.

SUMMARY OF THE INVENTION

The object of the present invention is, therefore, to provide a process for effectively preventing the transfer of harmful organisms from the series of zooplankton including the epifauna thereof and of phytoplankton including the resting stages thereof with the ballast water of ships. The process should make it possible, in addition to combating the well known cysts and zebra mussels, to effectively destroy other organisms taken up with ballast water. It is a further object to carry out the process using an agent which will decompose sufficiently quickly for no ecotoxicological problems to occur when the ballast water is discharged.

A process has been found for preventing contamination of navigable waters with organisms from the series of zooplankton including the epifauna thereof and of phytoplankton including the resting stages thereof (cysts) which are taken up with the ballast water of ships and transferred to another location when the ballast water is discharged. The process comprises adding an agent containing a peroxygen compound to the ballast water, allowing the agent to react until the organisms are substantially destroyed, and discharging the ballast water thus treated into the aquatic environment. It is characterized in that the agent contains, as a peroxygen compound, a water-soluble percarboxylic acid with 1–6 carbon atoms. The agent is preferably added in a quantity corresponding to 0.1 to 200 mg of percarboxylic acid per liter of ballast water.

The term "plankton" means all the animal and plant organisms in all their forms suspended in water. The term "zooplankton" means organisms in egg form, larval form and adult form. The term "phytoplankton" also means the resting stages of the organisms such as cysts. The organisms to be destroyed in the ballast water are primarily representatives of the following taxonomic groups:

unicellular algae, the physiology of which resembles that of toxic red tide algae. The zooplankton organisms to be destroyed are primarily copepods and their larval stages, representatives of the vagiel benthos fauna including Crustacea of various stages of life, and also larval and egg stages of mussels, crustaceans and fish; organisms of the series of coelenterates, rotifers, tunicates, pteropods and larval stages of sponges, nemertines, molluscs, annelids, bryozoa and echinoderms may also be contained in the ballast water. Destruction of these organisms found in the ballast water is also desirable for the prevention of transfer.

It has been found that by treating ballast water with a percarboxylic acid, also known as peroxycarboxylic acid, a wide range of organisms may be destroyed. The percarboxylic acid acts as a biocide and has a broad spectrum of action. The term "substantially destroyed" means a rate of destruction of generally at least 90%, preferably more than 99% and a reduction in the hatching rate of eggs by at least 50%. Although a 100% destruction rate may be obtained without difficulty in vitro, a 100% destruction rate is not always guaranteed in practice, nor is it absolutely necessary, in view of the size of the ballast chambers in the ship, the dead spaces which cannot be excluded, and the possibly incomplete mixing of the small amount of biocidal agent with the large amount of ballast water.

The biocidal agent to be added to the ballast water may contain one or more percarboxylic acids. The agent is usually an aqueous solution which may also contain, apart from the one or more percarboxylic acids, other active biocides and/or other auxiliaries such as, e.g., surfactants.

The agents to be used according to the invention contain a water-soluble percarboxylic acid with 1 to 6, preferably 1 to 3 carbon atoms. The percarboxylic acid may have one or two peroxycarboxyl groups and, if necessary, also one or two hydroxyl groups. Examples of suitable percarboxylic acids are performic acid, peracetic acid, perpropionic acid, perlactic acid, pertartaric acid, mono- and diperoxysuccinic acid, mono- and diperoxyglutaric acid and mono- and diperoxyadipic acid. Particularly preferred biocidal agents to be used contain peracetic acid, performic acid, perpropionic acid or mixtures of said percarboxylic acid, particularly mixtures of peracetic acid and performic acid. An effective peracid combination contains at least two of the above-mentioned peracids of dicarboxylic acids.

Normally, the biocidal agent containing one or more percarboxylic acids also contains hydrogen peroxide and the carboxylic acids on which the percarboxylic acids present are based. Such mixtures result from the preparation of the agents containing percarboxylic acid by reaction of one or more carboxylic acids with an aqueous hydrogen peroxide solution. An agent which can be obtained in this way may be used before or after the equilibrium is reached. An agent based on a so-called equilibrium percarboxylic acid solution is particularly preferred, especially an equilibrium peracetic acid solution to which one or more other biocidal components and/or auxiliaries are added prior to use.

According to a preferred embodiment, the biocidal agent used is a solution containing peracetic acid, performic acid, acetic acid, formic acid, hydrogen peroxide and water in a total quantity of at least 95 wt. %. Due to the means of preparation, such a solution may also contain a mineral acid catalyst and active oxygen stabilizers. Such a solution may be obtained in a simple manner by adding formic acid to a solution containing peracetic acid, acetic acid, hydrogen peroxide and water, for example, a 1 to 35 wt. %, particularly 1 to 15 wt. % equilibrium peracetic acid, or by adding a water-soluble formate to an equilibrium peracetic acid solution containing mineral acid as catalyst. Performic acid is more effective compared with peracetic acid, but also more susceptible to decomposition. Advantageously, therefore, formic acid is added to the solution containing peracetic acid only just prior to use and the mixture is added to the ballast water after a reaction time lasting some hours. It is also possible to add a solution containing peracetic acid as the sole percarboxylic acid and formic acid separately to the ballast water; the efficiency of this combination is higher than that of the solution containing exclusively peracetic acid, but lower than that obtained using a solution containing peracetic acid and performic acid.

Other biocidal substances may also be added to the agent containing carboxylic acid or may be added directly to the ballast water, instead of formic acid. Suitable biocides of this kind are acrolein-cleaving acetals, for example, 2-vinyl-1,3-dioxolane or 2-vinyl-1,3-dioxane. Whereas the acid content of a percarboxylic acid solution is sufficient to cleave the acetal, it is advantageous, if the acetal is added directly to the ballast water, to use the acetal in combination with an acid or an acid-cleaving agent.

According to a further embodiment, an alkali metal cyanide is added in a small quantity to the ballast water separately from an agent containing percarboxylic acid. The cyanide is used advantageously in a quantity of about 0.1 to 20 mg per liter of ballast water. The quantity of the agent containing percarboxylic acid, to which the cyanide may also be added directly, if necessary, is from 0. 1 to 200 mg, particularly 1 to 100 mg and particularly preferably 1 to 30 mg of percarboxylic acid per liter of ballast water. According to a particularly preferred embodiment, a percarboxylic acid solution and a cyanide are used in combination, with 5 to 100 mg of a 1 to 15 wt. % equilibrium peracetic acid and, together with the acid or separately, at the same time or after a delay, 1 to 5 mg cyanide per liter of ballast water are added to the ballast water.

It has been found that the combined use of an agent containing percarboxylic acid and cyanide leads to a synergistic effect. Whereas the eggs of many zooplankton organisms are not destroyed satisfactorily either by the sole use of a solution containing percarboxylic acid or by the use of cyanide, the combined use of the two substances proves very effective. When this combination is used, it is also possible to reduce the concentration of percarboxylic acid. Whereas the use of cyanide alone effectively destroys adult animals, the eggs of certain organisms survive; on the other hand, adult animals of certain organisms are incompletely destroyed by the sole use of a percarboxylic acid, though the eggs thereof are destroyed.

When an equilibrium peracetic acid and formic acid are used in combination, the formic acid being added directly to the peracetic acid or simultaneously to the ballast water, the formic acid is used in a quantity of 10 to 1000 wt. %, based on the sum of peracetic acid and acetic acid.

The agent containing percarboxylic acid or a combination thereof with further biocides may be added to the ballast water by a single addition or multiple additions. If necessary, a particular content of percarboxylic acid is maintained in the ballast water until substantially all the organisms in the adult, larval or egg form are destroyed. After the addition of the biocidal agent, the ballast water is retained in the ballast tanks of the ship until the destruction is substantially complete; only afterwards is the ballast water discharged to the aquatic environment. According to an alternative procedure, the ballast water may also be transferred to a tank farm provided for this purpose in the harbour area and treated there according to the invention.

The process according to the invention makes it possible to effectively prevent the transfer of unwanted organisms from one locality to another. The agents to be used are used in a concentration such that either they are degraded after fulfilling their task or they may be discharged as an ecotoxicological substance. The biocidal substances to be used according to the invention are used advantageously in a quantity such that, after the scheduled transit time, the population of organisms in the ballast water is destroyed. Accordingly, if the transit time is short, the concentration of effective biocides will be higher than if the transit time is long. Even in the event of the combined use of a solution containing percarboxylic acid and a cyanide, an excessive cyanide concentration in the ballast water to be discharged is avoided by the fact that the cyanide is oxidised to harmless substances by the percarboxylic acid present.

DETAILED DESCRIPTION OF THE INVENTION

The examples below show the effectiveness in principle of the solutions containing percarboxylic acid on the survival rate of selected test organisms under defined conditions.

EXAMPLES B1 TO B6 AND COMPARISON EXAMPLES VB1 TO VB4

Tests were carried out on Artemia salina (crustaceans) as test organism, namely in the egg, larval and adult stage of life. The medium examined was North Sea water with a salinity of 3.3% and the fixed temperature was room temperature (about 20° C.). The adult Artemia were kept in 5 liter sea water tanks; the Artemia eggs and larvae were kept in 2 ml screw top jars. The mortality was determined from the survival rates of the adult animals and nauplii over an exposure time of up to 72 hours. The tests were carried out in three parallel groups. In the case of the eggs, the hatching rate (%) was determined after the stated times.

The following active substances and combinations were tested:
A: Equilibrium peracetic acid containing 5 wt. % peracetic acid, 27.5 wt. % hydrogen peroxide and 5.5 wt. % acetic acid, prepared from acetic acid and aqueous hydrogen peroxide in the presence of 2 wt. % sulfuric acid.
B: Mixture of a solution according to A with 85 wt. % formic acid in a mixing ratio of 1 to 1. The mixture was used after being allowed to stand for 1 hour.
C: Mixture of a solution according to A with a combination of 2-vinyl-1, 3-dioxolane with maleic anhydride (1:1) (=VDL-K). Mixing ratio of A to VDL-K equals 100:1. The mixture was used immediately after preparation.

Table 1 shows the mortality in % of adult Artemia salina—means of three parallel tests in each case using agents A, B, C and VDL-K in the given concentrations c (mg/l). The control contained 60 animals, the samples treated with an agent according to the invention contained 150 animals.

TABLE 1

| Example Time (h) | VB 1 Control | B 1 A 2000 mg/l | B 2 B 2000 mg/l | B 3 C 2000 mg/l | VB 2 VDL-K 20 mg/l |
|---|---|---|---|---|---|
| 0.5 | 0 | 0 | 0.7 | 0 | 0 |
| 1 | 0 | 0 | 12.7 | 0 | 0 |
| 2 | 0 | 0 | 73.3 | 8 | 0.7 |
| 3 | 0 | 3 | 96.7 | 18 | 2 |
| 5 | 2 | 9 | 100 | 32 | 8 |
| 7 | 2 | 13 | 100 | 100 | 42 |
| 10 | 3 | 24 | 100 | 100 | 51 |
| 24 | 3 | 84 | 100 | 100 | 100 |
| 48 | 3 | 92 | 100 | 100 | 100 |
| 72 | 3 | 97 | 100 | 100 | 100 |

Table 2 shows the mortality in % of larval Artemia salina (nauplii) after exposure. The means of 3 parallel tests and the total figures for the test organisms per test group are given.

The mortality of the adult Artemia reached only 97% using the test concentration of A, whereas the effect of B and C is much more rapid and quantitative.

TABLE 2

| Example Time (h) | VB 3 Control | B 4 A 2000 mg/l | B 5 B 2000 mg/l | B 6 C 2000 mg/l | VB 4 VDL-K 20 mg/l |
|---|---|---|---|---|---|
|  | n = 182 | n = 211 | n = 122 | n = 195 | n = 211 |
| 0.5 | 0 | 0 | 0.5 | 0 | 0 |
| 1 | 0 | 0 | 91.6 | 0 | 0 |
| 2 | 0 | 1 | 100 | 2 | 1 |
| 3 | 0 | 1 | 100 | 50 | 21 |
| 5 | 0 | 23 | 100 | 100 | 97 |
| 10 | 0.5 | 73 | 100 | 100 | 100 |
| 24 | 0.5 | 100 | 100 | 100 | 100 |
| 48 | 0.5 | 100 | 100 | 100 | 100 |
| 72 | 0.5 | 100 | 100 | 100 | 100 |

EXAMPLE 7

When resting eggs of Artemia salina were exposed to the active substances A, B and C and the above-mentioned active substance concentrations, no larva development takes place.

EXAMPLE 8

The test organisms used were adult shrimps (Mysis sp) which were exposed to substance according to A (c =2000 mg/l). After only 0.5 h, the mortality was 100.

EXAMPLES 9 AND 10

The active substances used were: Sodium cyanide and the equilibrium peracetic acid solution used above (E-PAA) (=A). In examples 9 and 10, the cuanide CN and the E-PAA were added separately but simultaneously to the water with the adult Artemia, nauplii and resting eggs of Artemia. The use quantities per liter of water were 3.3 mg of NaCN and 10 mg of E-PAA in example 9 (formulation A) and 46.3 mg of NaCN and 50 mg of E-PAA in example 10 (formulation A). Table 3 shows the results - mortality and hatching rate in %.

TABLE 3

| Example Test Artemia Time (h) | 9a Adult nauplii Mortality (%) | 9b | 10*) Eggs Hatching rate (%) |
|---|---|---|---|
| 1 | 0 | 0 | 0 |
| 2 | 0 | 2.1 | |
| 5 | 13.3 | 12.8 | |
| 16 | 66.7 | 97.9 | 20 |
| 24 | 96.7 | 100.0 | 30 |

*)Control hatching rate without active substances: 1 h, 40%; 14 h 90%; 24 h 95%

Publications cited herein are hereby incorporated by reference.

What is claimed is:

1. A process for treating ballast sea water capable of contaminating navigable waters with organisms of zooplankton including epifauna thereof and phytoplankton including resting stages thereof (cysts) which are taken up with ballast water of ships and transferred to another locality when the ballast water is discharged, comprising adding an effective amount of an agent containing at least one peroxygen compound and performic acid to the ballast water, allowing the agent to react until the organisms are substantially destroyed, and discharging the ballast water thus treated into an aquatic environment, wherein the agent contains, as the at least one peroxygen compound, a water-soluble percarboxylic acid with 2 to 6 carbon atoms and which is added in an amount corresponding to 0.1 to 200 mg of percarboxylic acid per liter of ballast water.

2. The process according to claim, wherein the agent contains at least one percarboxylic acid selected from the group consisting of peracetic acid and perpropionic acid, and further comprises hydrogen peroxide.

3. The process according to claim 1, wherein the agent contains as a source of the percaboxylic acted an equilibrium peracetic acid solution with a peracetic acid content of 1 to 10 wt. %.

4. The process according to claim 1, wherein the agent, in a total quantity of at least 95 wt. % of said agent, comprises peracetic acid, and performic acid, and further comprises, acetic acid, formic acid, hydrogen peroxide and water.

5. The process according to claim 1, wherein in addition to a percarboxylic acid and performic acids one or more other biocidal compounds are added to the ballast water either together or separately from said percarboxylic acid and said performic acid, or wherein other biocidal compounds are added to the agent containing percarboxylic acid and performic acid before the addition thereof to ballast water.

6. The process according to claim 5, wherein the other biocidal compound is formic acid, a cyanide or an acrolein-liberating acetal.

7. The process according to claim 5, wherein cyanide is used in a quantity of 0.1 to 20 mg per liter of ballast water.

8. The process according to claim 1, wherein an agent containing 5 to 100 mg of a 1 to 15 wt. % equilibrium peracetic acid solution as a source of the at least one peroxygen compound and performic acid is added, and additionally together or separately, simultaneously of after delay, 1 to 5 mg of cyanide is added per liter of ballast water.

9. The process according to claim 1, further comprising optionally adding to the ballast water additional agent containing percarboxylic acid and optionally one or more biocidal compound(s) and reacting until at least 99% of the organisms are before the ballast water is discharged into an aquatic environment.

10. The process according to claim 1, wherein treatment of the ballast water is carried out on board a ship or in a treatment plant on land, and the treated ballast water is discharged into an aquatic environment in a filtered or unfiltered state.

* * * * *